United States Patent
Moher et al.

(10) Patent No.: US 9,705,662 B2
(45) Date of Patent: Jul. 11, 2017

(54) SYSTEM AND METHOD FOR RADIO FULL DUPLEX

(71) Applicant: Huawei Technologies Co., Ltd., Shenzhen (CN)

(72) Inventors: Michael Moher, Stittsville (CA); Eddy Shi-Ning Hum, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 167 days.

(21) Appl. No.: 14/460,946

(22) Filed: Aug. 15, 2014

(65) Prior Publication Data
US 2016/0050062 A1 Feb. 18, 2016

(51) Int. Cl.
*H04L 5/14* (2006.01)

(52) U.S. Cl.
CPC .................... *H04L 5/1461* (2013.01)

(58) Field of Classification Search
CPC ...... H04B 1/10; H04B 1/715; H04B 7/15528; H04L 5/1461; H03H 1/0007
See application file for complete search history.

(56) References Cited

U.S. PATENT DOCUMENTS

| 7,768,876 B2 | 8/2010 | Dahl et al. | |
|---|---|---|---|
| 2002/0176490 A1* | 11/2002 | Kamali | H04B 3/46 375/222 |
| 2003/0095591 A1 | 5/2003 | Rekai et al. | |
| 2009/0186582 A1* | 7/2009 | Muhammad | H04B 1/525 455/63.1 |
| 2009/0213770 A1* | 8/2009 | Mu | H04B 1/123 370/281 |
| 2011/0143655 A1 | 6/2011 | Ahn et al. | |
| 2011/0228828 A1 | 9/2011 | Wang et al. | |
| 2011/0244790 A1 | 10/2011 | Kwak et al. | |
| 2012/0195351 A1 | 8/2012 | Banwell et al. | |
| 2013/0102254 A1* | 4/2013 | Cyzs | H04B 1/126 455/63.1 |

(Continued)

FOREIGN PATENT DOCUMENTS

| CN | 101420246 A | 4/2009 |
|---|---|---|
| CN | 102769487 A | 11/2012 |

(Continued)

OTHER PUBLICATIONS

PCT International Search Report and Written Opinion, PCT/CN2015/086428, Applicant: Huawei Technologies Co., Ltd., dated Nov. 6, 2015, 11 pages.

*Primary Examiner* — Alex Skripnikov
(74) *Attorney, Agent, or Firm* — Slater Matsil, LLP

(57) ABSTRACT

In one embodiment, a method for calibrating a full-duplex radio system includes transmitting, by a first radio transmitter, a first signal and receiving, by a first radio receiver, a first version of the first signal. The method also includes receiving, by a second radio receiver, a second version of the first signal and transmitting, by a second radio transmitter, a second signal. Additionally, the method includes receiving, by the first radio receiver, a received version of the second signal and determining a response from the second radio transmitter to the first radio receiver in accordance with the first version of the first signal, the second version of the first signal, and the received version of the second signal.

26 Claims, 4 Drawing Sheets

(56) References Cited

U.S. PATENT DOCUMENTS

| | | |
|---|---|---|
| 2013/0188760 A1 | 7/2013 | Subramanian et al. |
| 2013/0286903 A1 | 10/2013 | Khojastepour et al. |
| 2014/0198688 A1 | 7/2014 | Li et al. |
| 2014/0198691 A1 | 7/2014 | Oberhammer et al. |
| 2014/0219449 A1 | 8/2014 | Shattil et al. |
| 2015/0318976 A1* | 11/2015 | Eltawil ................ H04L 5/1461 370/278 |
| 2016/0065318 A1 | 3/2016 | Lee |

FOREIGN PATENT DOCUMENTS

| | | |
|---|---|---|
| CN | 103117970 A | 5/2013 |
| CN | 103580720 A | 2/2014 |
| WO | 2008048534 A1 | 4/2008 |
| WO | 2014113725 A1 | 7/2014 |

\* cited by examiner

SYSTEM AND METHOD FOR RADIO FULL DUPLEX

TECHNICAL FIELD

The present invention relates to a system and method for wireless communications, and, in particular, to a system and method for radio full duplex.

BACKGROUND

In the field of radio communications, it is desirable to transmit and receive from the same antenna or antennas. High efficiency is achieved when the transmission and reception can occur simultaneously on the same radio channel. Transmitting and receiving on the same channel is known as full duplex on same channel. High power transmitted signals with low power received signals may lead to self-interference of the transmitted signal into the received signal. That is, the received signal contains the desired signal plus self-interference. When the antenna transmits, a portion of the transmitted signal bounces back and is received by the receiver as self-interference. Since the transmit signal is at much higher power, a high degree of rejection is required. To achieve this level of rejection, distortions introduced by the measurement and cancellation system may be compensated.

SUMMARY

An embodiment method for calibrating a full-duplex radio system includes transmitting, by a first radio transmitter, a first signal and receiving, by a first radio receiver, a first version of the first signal. The method also includes receiving, by a second radio receiver, a second version of the first signal and transmitting, by a second radio transmitter, a second signal. Additionally, the method includes receiving, by the first radio receiver, a received version of the second signal and determining a response from the second radio transmitter to the first radio receiver in accordance with the first version of the first signal, the second version of the first signal, and the received version of the second signal.

An embodiment system for radio full duplex includes an antenna and a first transmitter coupled to the antenna, where the first transmitter is configured to apply a first signal to the antenna, and where the antenna is configured to transmit the first signal. The system also includes a first receiver coupled to the antenna, where the first receiver is configured to receive a reflection of a portion of the first signal from a transmission system and a second transmitter, where the second transmitter is configured to cancel the reflection of the first signal by transmitting a second signal. Additionally, the system includes a second receiver coupled to the antenna, where the second receiver is configured to sample the reflection of the first signal and an equalizer coupled to an input of the second transmitter, where the equalizer is configured to compensate a response from the second receiver to the second transmitter.

An embodiment full duplex radio transceiver includes an antenna configured to transmit a first signal, receive a first version of the first signal, and receive a second version of the first signal. The antenna is also configured to transmit a second signal and receive a third version of the second signal. The full duplex radio transceiver also includes a processor and a computer readable storage medium storing programming for execution by the processor, the programming including instructions to determine a response in accordance with the first version of the first signal, the second version of the first signal, and the third version of the second signal.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
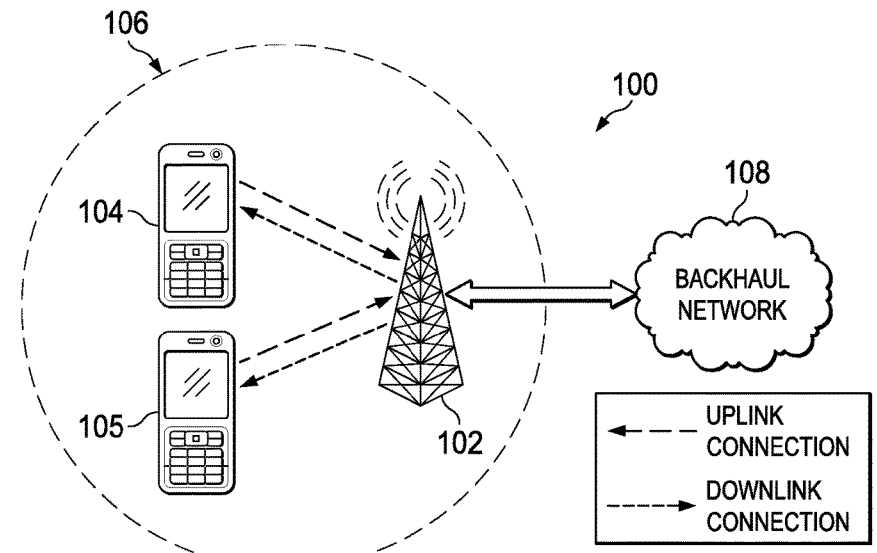
FIG. 1 illustrates a diagram of a wireless network for communicating data.

FIG. 1 illustrates network 100 for communicating data. Network 100 includes communications controller 102 having a coverage area 106, a plurality of user equipments (UEs), including UE 104 and UE 105, and backhaul network 108. Two UEs are depicted, but many more may be present. Communications controller 102 may be any component capable of providing wireless access by, inter alia, establishing uplink (dashed line) and/or downlink (dotted line) connections with UE 104 and UE 105, such as a base station, an enhanced base station (eNB), an access point, a picocell, a femtocell, and other wirelessly enabled devices. UE 104 and UE 105 may be any component capable of establishing a wireless connection with communications controller 102, such as cell phones, smart phones, tablets, sensors, etc. Backhaul network 108 may be any component or collection of components that allow data to be exchanged between communications controller 102 and a remote end. In some embodiments, the network 100 may include various other wireless devices, such as relays, femtocells, etc. Network 100 may be a cellular network or a WiFi network.

UEs 104 and 105 and communications controller 102 may contain full duplex antennas. Full duplex antennas transmit and receive simultaneously on the same radio frequency. Interference cancellation systems, such as those used for full-duplex transmission on the same radio frequency (RF) channel require very accurate measurements to achieve high rejection, for example 100 dB. A calibration technique may be used to obtain the desired accuracy. An embodiment contains a primary radio transmitter and receiver and a secondary measurement-cancellation receiver and transmitter. To achieve the maximum rejection, it is often desirable to determine the distortion caused by the secondary measurement-cancellation receiver and transmitter while in-circuit. An alternative approach is measuring the secondary receiver and transmitter in isolation. Calibration involves the development of compensation mechanisms to minimize the distortions caused by the secondary system on the measurement process. An embodiment measures the response of the various subsystems: the primary transmitter-secondary receiver, the primary transmitter-primary receiver, and the secondary transmitter-primary receiver. By processing these measurements, the response of the overall secondary system, the secondary transmitter-secondary receiver, is estimated. The appropriate compensation may be computed directly from these measurements using the method of least squares. The secondary subsystem is calibrated in-circuit, without the measurement of individual components or the secondary subsystem.

Figure 2:
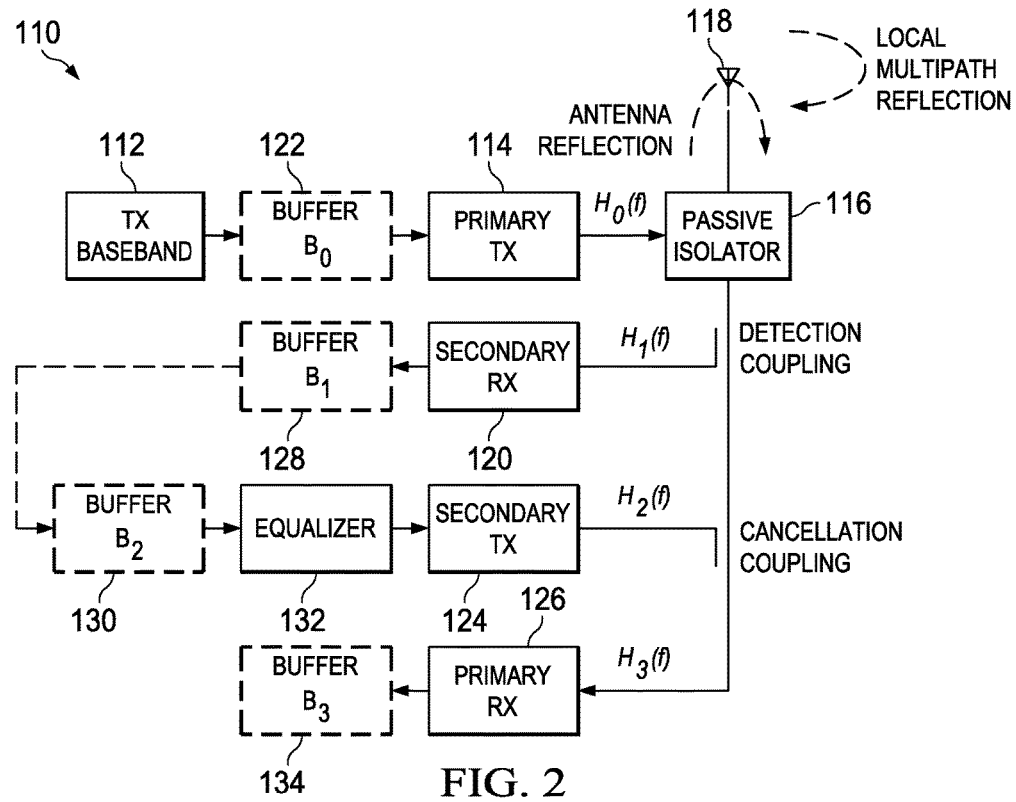
FIG. 2 illustrates a block diagram of an antenna system.

FIG. 2 illustrates a block diagram of antenna system 110. The cancellation system includes receiver 120, buffer 128, buffer 130, equalizer 132, and transmitter 124. Transmitter 114, the primary transmitter, has access to buffer 122. Baseband signal 112 is placed in buffer 122, an input buffer to transmitter 114. Alternatively, a bandpass signal may be used.

Transmitter 114 passes the signal from buffer 122 to antenna 118 through isolator block 116. Isolator block 116 separates the transmitted and received signals, because they use the same antenna, antenna 118. An example of an isolator is a three-port RF device known as a circulator. A circulator is a directional device that passes the transmit signal from primary transmitter 114 to antenna 118, passes the receive signal from antenna 118 to primary receiver 126, and attempts to minimize the amount of transmit signal that passes from the primary transmitter 118 to the primary receiver 126. That is, isolator block 116 rejects the transmitted signal from the received signal path, but this rejection is not perfect, and there may be significant self-interference on the receive path. Receiver 120, the secondary receiver, samples the reflection of the signal transmitted by transmitter 114, the self-interference. The reflection may be from the transmission system. The transmission system includes the antenna, connections between the antenna and other elements, and the transmission media. Then, receiver 120 places the sampled signal in buffer 128, an output buffer for receiver 120. Receiver 126, the primary receiver, also samples the self-interference, which it places in buffer 134. Buffer 134 is an output buffer for receiver 126.

Then, transmitter 114, the primary transmitter, is disabled, for example by setting buffer 122 to zero. A test signal, for example the signal in buffer 128 received by receiver 120, is inserted into buffer 130, the input buffer for transmitter 124. Equalizer 132 is used to equalize the secondary path; this equalizer is initially set to unity, i.e. the all-pass function. The test signal is passed to transmitter 124 through equalizer 132. Transmitter 124 transmits the test signal, which is received by receiver 126, and placed in buffer 134. During this time, antenna system 110 may be closed to incoming messages.

The primary transmitter distortion is $H_0(f)$, the secondary receiver distortion is $H_1(f)$, the secondary transmitter distortion is $H_2(f)$, and the primary receiver distortion is $H_3(f)$. $H_1(f)$ and $H_2(f)$ cannot be isolated for separate measurement with the available access points in block diagram 110. However, the response of the secondary system may be determined from the responses of the other systems by equalizer 132. Then, the response may be compensated for using least squares estimation. Transmitter 114, receiver 120, transmitter 124, and receiver 126 may contain filters, up-converters, down-converters, amplifiers, or other devices.

Figure 3:
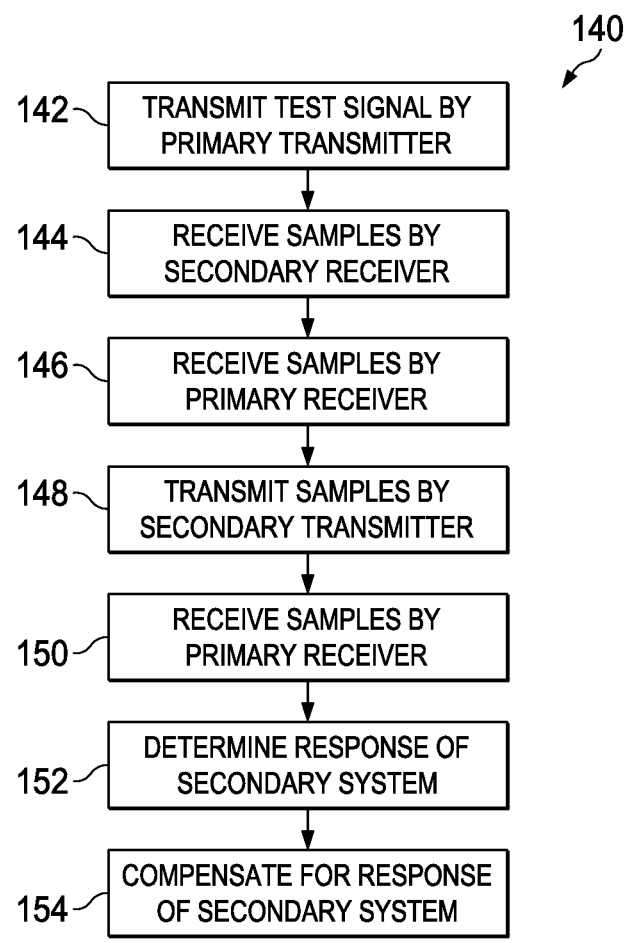
FIG. 3 illustrates a flowchart of an embodiment method of determining a response of an antenna.

FIG. 3 illustrates flowchart 140 for a method of performing calibration for a secondary antenna system. During calibration, the antenna system may be closed to incoming traffic. Initially, in step 142, a test signal is transmitted by a primary transmitter using an antenna. A test signal $x_0$ is created and inserted into the input buffer to the primary transmitter for transmission by the primary transmitter. Meanwhile, the input buffer of the secondary transmitter is cleared, so the output from the secondary transmitter is zero.

Next, in step 144, the secondary receiver receives samples of the signal transmitted in step 142. These samples are collected in the output buffer for the secondary receiver. The received signals are denotes by $y_{01}$.

Also, in step 146, samples are received by primary receiver 126. These received samples are placed in the output buffer of the primary receiver, and are denoted by $y_{03}$.

Then, in step 148, the secondary transmitter transmits the samples received by the secondary receiver. The samples from the output buffer of the secondary receiver are transferred to the input buffer of the secondary receiver, and passed through an equalizer. Meanwhile, the input buffer for the primary transmitter is cleared, so the output from the primary transmitter is zero.

Next, in step 150, the signal transmitted in step 148 is received and sampled by the primary receiver. These samples are placed in the output buffer for the primary receiver, and are denoted by $y_{0123}$. In an embodiment Steps 148 and 150 are performed after steps 142, 144, and 146.

Finally, in step 152, the response of the secondary system is determined. The samples $y_{03}$ represent the desired response of the system to the input $x_0$. The samples $y_{0123}$ represent the response of the overall system, from the primary transmitter to the secondary receiver to the secondary transmitter to the primary receiver. It is desirable to compensate or equalize the $y_{0123}$ samples so they match the $y_{03}$ samples. This may be done using a least-squares approach. Alternatively, the equalizer may be estimated in the frequency domain by using a fast Fourier transform (FFT) to convert the samples to the frequency domain representation. However, with the frequency-domain approach, it is still desirable to minimize the square error, as with the time-domain least-squares approach.

With the least-squares approach, for example, a data matrix is defined as:

$$Y_{0123} = \begin{bmatrix} y_{0123}(n) & y_{0123}(n-1) & \ldots & y_{0123}(n-M+2) & y_{0123}(n-M+1) \\ y_{0123}(n+1) & y_{0123}(n) & y_{0123}(n-1) & \ldots & y_{0123}(n-M) \\ y_{0123}(n+2) & y_{0123}(n+1) & y_{0123}(n) & \ldots & y_{0123}(n-M-1) \\ \vdots & \vdots & \vdots & \vdots & \vdots \\ \vdots & \vdots & \vdots & \vdots & \vdots \\ y_{0123}(n+N-2) & y_{0123}(n+N-3) & \ldots & y_{0123}(n+N-M) & y_{0123}(n+N-M-1) \\ y_{0123}(n+N-1) & y_{0123}(n+N-2) & y_{0123}(n+N-3) & \ldots & y_{0123}(n+N-M) \end{bmatrix}.$$

The value of n may be 0 and $y_{0123}(k)$ for k<0. Alternatively, n is any positive integer less than N-M.

Then, in step 154, the equalizer compensates for the response of the secondary system. The equalizer e is defined as the vector that solves the equation in the least-squares sense:

$$Y_{0123}e = y_{03}.$$

Any method of solving for e may be used. The dimension M of e affects both the performance of the equalizer and the complexity of the implementation. Once e is known, it is applied as equalizer 132, a time-domain M-tap equalizer.

Measurements may be performed in a static system with no incoming signal to antenna 118, because a time-varying environment or extraneous signals may affect the accuracy of the compensation.

In one embodiment, the base signal $x_0$ is attenuated relative to normal operation to avoid saturating the primary receiver. Alternatively, attenuation is switched into the primary receiver path during calibration, which does not affect level-dependent distortions in the secondary subsystem, and consequently does not affect optimum estimation of the compensation.

In another embodiment, the response of the secondary system is determined in the frequency domain. From the pair of vectors $x_0$ and $y_{0123}$, the overall response of the system $H_0H_1H_2H_3(f)$ may be determined. Also, the subsystem response $H_0H_3(f)$ may be estimated from $x_0$ and $y_{03}$. Then, the secondary subsystem response may be estimated by:

$$H_1H_2(f) = \frac{H_0H_1H_2H_3(f)}{H_0H_3(f)}.$$

Inverting $H_1H_2(f)$ provides the desired equalizer response in the frequency domain.

In other embodiments, additional access points are added to isolate components of the system in different manners and perform separate measurements. For example, access points may be added at the points where secondary receiver and transmitter connect to the main signal path; however, test signals injected and measured at these points may introduce other distortions which cannot be compensated.

Figure 4:
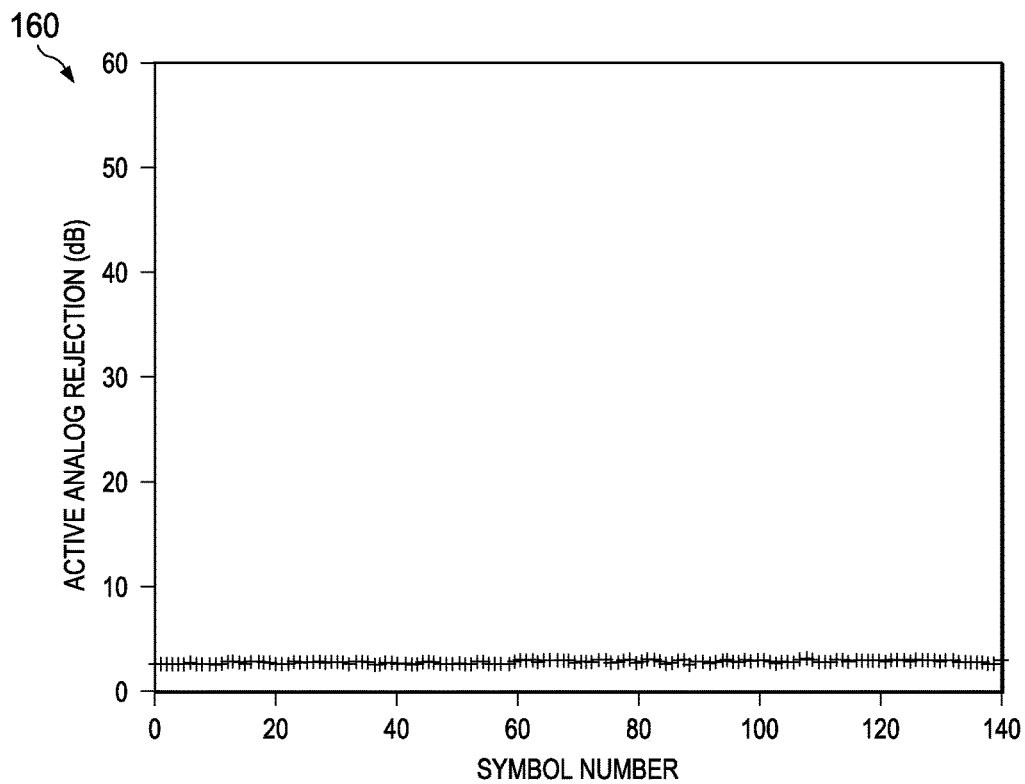
FIG. 4 illustrates a graph of self-interference rejection versus slot time before calibration and equalization.
Figure 5:
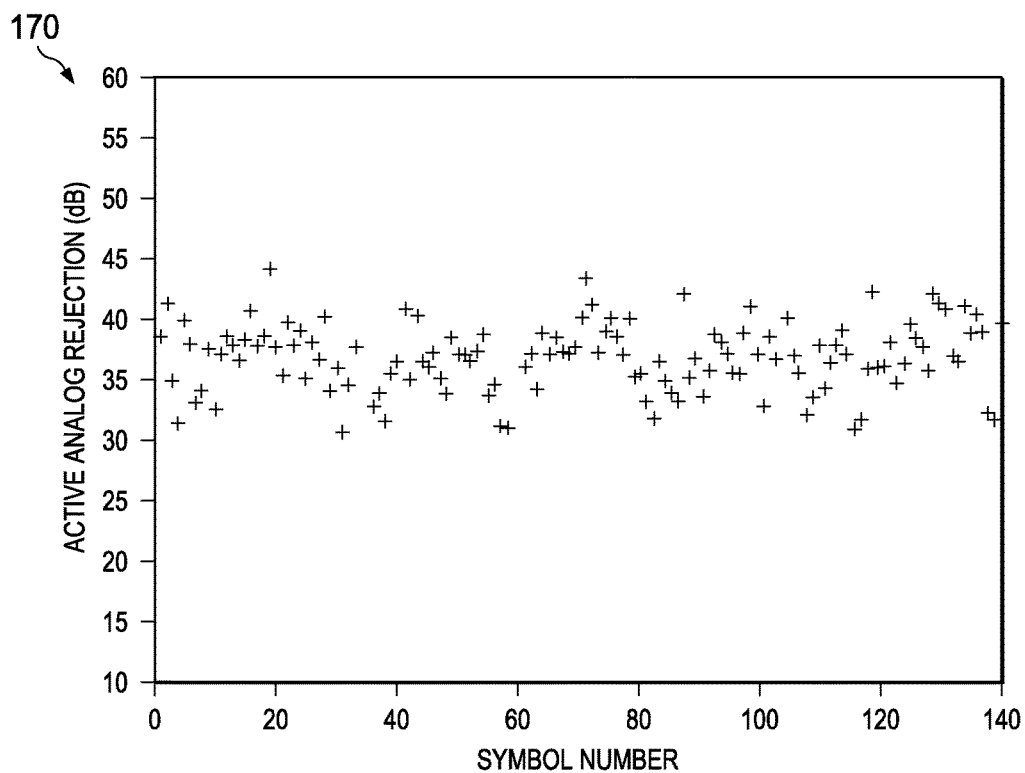
FIG. 5 illustrates a graph of self-interference rejection versus slot time after calibration and equalization.

FIG. 4 illustrates graph 160 of self-interference rejection versus slot number before calibration and equalization. There is significant reduction in rejection due to secondary path distortions. FIG. 5 illustrates graph 170 of self-interference rejection versus slot number after calibration and equalization. There is much more robust rejection performance with secondary path equalization.

Figure 6:
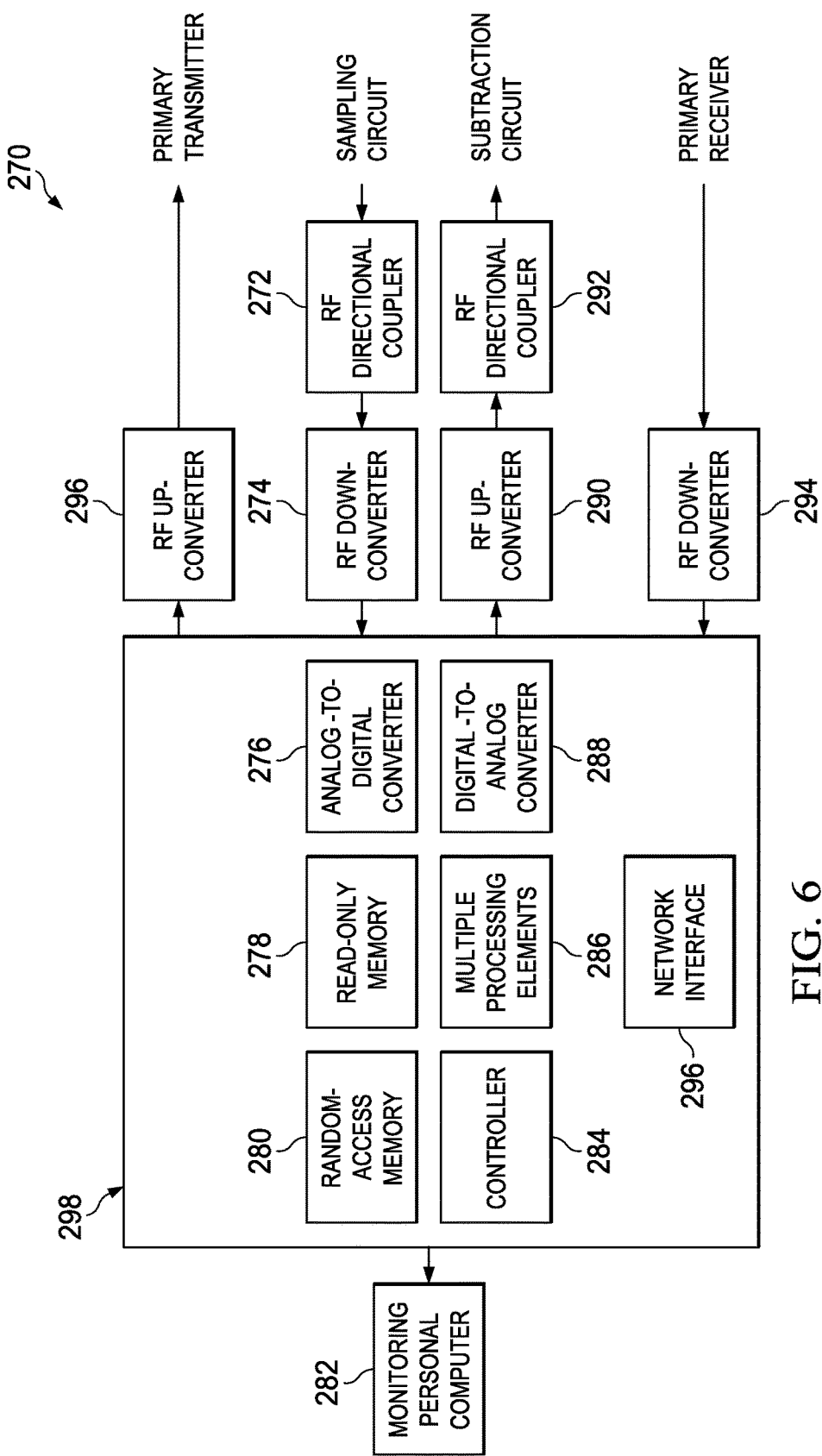
FIG. 6 illustrates a block diagram of an embodiment general-purpose computer system.

FIG. 6 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, down-converters, up-converters, etc. The processing system may contain one or more processing components and their associated memory.

In an embodiment, for the primary transmitter, the signal is digitally generated in processing elements 286. A copy is kept in random access memory 280 to be used in the channel estimation. The primary transmit signal is then converted to analog form using the digital-to-analog converter 288, and then passes to up-converter 296, an RF up-converter, which may also amplify the signal.

In an embodiment, radio frequency (RF) directional coupler 272 is used to sample a signal containing the self-interference plus the desired signal.

This sampled signal is down-converted by down-converter 274, an RF down-converter.

Then, the down-converted signal enters computation module 298. The down-converted signal is converted to digital samples by analog-to-digital converter 276; this represents the response from the primary transmitter to secondary receiver.

The response to the primary receiver is obtained in a similar manner using down-converter 294, an RF down-converter, and analog-to-digital converter 276.

Computation of the equalizer may use processing elements 286. In one example, processing elements 286 are shared with other functions in a self-interference cancellation system. Alternatively, the equalizer may be computed off-line using a personal computer 282. In the former case, the digital signals are processed by the processing elements 286, which are organized and connected by controller 284, which stores its program in read-only memory 278, and stores interim processing results in random-access memory 280. A similar method may be used in the case of personal computer.

Then, for estimating the channel response between the secondary transmitter and primary receiver through the subtraction circuit, the secondary transmitter output is converted from digital-to-analog form with digital-to-analog converter block 288, and proceeds to up-converter 290, an RF up-convertor.

The up-converted signal is then passed to directional coupler 292, an RF directional coupler.

Computation module 298 also includes one or more network interface 296, which may include wired links, such as an Ethernet cable or the like, and/or wireless links to access nodes or different networks. Network interface 296 allows the computation module to communicate with remote units via the network. For example, the network interface may provide wireless communication via one or more transmitters/transmit antennas and one or more receivers/receive antennas. In an embodiment, the processing unit is coupled to a local area network or a wide area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for calibrating a full-duplex radio transceiver, the method comprising:
   transmitting, by a primary radio transmitter, a first signal over a common antenna via a transmit port of a duplexer;
   receiving, by a primary radio receiver, a first reflection of the first signal over a link between a receive port of the duplexer and the primary radio receiver;
   receiving, by a secondary radio receiver, a second reflection of the first signal over a first portion of the link extending between the receive port of the duplexer and the secondary radio receiver;
   equalizing, by an equalizer, the second reflection of the first signal to obtain an equalized reflection signal;
   transmitting, by a secondary radio transmitter, the equalized reflection signal over a second portion of the link extending between the secondary radio transmitter and the primary radio receiver;
   receiving, by the primary radio receiver, the equalized reflection signal; and
   determining a response over the second portion of the link in accordance with the first reflection of the first signal and the equalized reflection signal.

2. The method of claim 1, wherein the full-duplex radio transceiver is a component of a User Equipment.

3. The method of claim 1, wherein the full-duplex radio transceiver is a component of an infrastructure node in a wireless communication network.

4. The method of claim 1, wherein equalizing the second reflection of the first signal to obtain the equalized reflection signal comprises compensating for the response using least-squares estimation.

5. The method of claim 1, wherein the first signal and the equalized reflection signal are baseband signals.

6. The method of claim 1, wherein the first signal and the equalized reflection signal are bandpass signals.

7. The method of claim 1, further comprising attenuating the first signal before transmitting the first signal.

8. The method of claim 1, further comprising attenuating the first reflection of the first signal.

9. The method of claim 1, wherein determining the response from the secondary radio transmitter to the primary radio receiver comprises determining the response in a frequency domain.

10. The method of claim 1, wherein the primary radio receiver receives the equalized reflection signal and the first reflection of the first signal during a calibration period, and wherein the full-duplex radio transceiver does not communicate data with another device during the calibration period.

11. The method of claim 10, wherein the first reflection of the first signal is received by the primary radio receiver prior to the equalized reflection signal during the calibration period.

12. A full-duplex radio transceiver comprising:
    an antenna;
    a duplexer coupled to the antenna;
    a primary transmitter coupled to a transmit port of the duplexer, wherein the primary transmitter is configured to transmit a first signal over the transmit port of the duplexer;
    a primary receiver coupled to a receive port of the duplexer, wherein the primary receiver is configured to receive a reflection of the first signal over a link extending between the receive port of the duplexer and the primary receiver;
    a secondary receiver coupled to the link extending between the receive port of the duplexer and the primary receiver, wherein the secondary receiver is configured to sample the reflection of the first signal at an intermediate point on the link to obtain a sampled reflection signal;
    an equalizer coupled to an output of the secondary receiver configured to equalize the sampled reflection signal to produce an equalized reflection signal; and
    a secondary transmitter coupled to the equalizer and to the link extending between the receive port of the duplexer and the primary receiver, the secondary transmitter configured to transmit the equalized reflection signal over a portion of the link extending between the secondary transmitter and the primary receiver,
    wherein the primary receiver is further configured to receive the equalized reflection signal, and to determine a response over the portion of the link extending between the secondary transmitter and the primary receiver in accordance with the reflection of the first signal and the equalized reflection signal.

13. The full-duplex radio transceiver of claim 12, wherein the full-duplex radio transceiver is a component in a User Equipment.

14. The full-duplex radio transceiver of claim 12, wherein the full-duplex radio transceiver is a component in an infrastructure node in a wireless communication network.

15. The full-duplex radio transceiver of claim 12, wherein the equalizer is configured to equalize the sampled reflection signal using least-squares estimation.

16. The full-duplex radio transceiver of claim 12, further comprising:
    a first buffer coupled to a first input of the primary transmitter;
    a second buffer coupled between the primary receiver and the equalizer;
    a third buffer coupled between the second buffer and the equalizer; and
    a fourth buffer coupled to an output of the secondary receiver.

17. The full-duplex radio transceiver claim 12, wherein the duplexer is a passive isolator.

18. The full-duplex radio transceiver claim 12, wherein the duplexer is an active isolator.

19. The full-duplex radio transceiver of claim 12, wherein the equalizer is a time-domain M-tap equalizer.

20. The full-duplex radio transceiver of claim 12, wherein the equalizer is a frequency-domain equalizer.

21. The full-duplex radio transceiver of claim 12, wherein the primary receiver receives the reflection of the first signal and the equalized reflection signal during a calibration period, and wherein the full-duplex radio transceiver does not communicate data with another device during the calibration period.

22. The full-duplex radio transceiver of claim 21, wherein the reflection of the first signal is received by the primary receiver prior to the equalized reflection signal during the calibration period.

23. A full-duplex radio transceiver comprising:
a processor; and
a non-transitory computer readable storage medium storing programming for execution by the processor, the programming including instructions to:
transmit, via a primary radio transmitter, a first signal over a common antenna via a transmit port of a duplexer;
receive, via a primary radio receiver, a first reflection of the first signal over a link between a receive port of the duplexer and the primary radio receiver;
receive, via a secondary radio receiver, a second reflection of the first signal over a first portion of the link extending between the receive port of the duplexer and the secondary radio receiver;
equalize the second reflection of the first signal to obtain an equalized reflection signal;
transmit, via a secondary radio transmitter, the equalized reflection signal over a second portion of the link extending between the secondary radio transmitter and the primary radio receiver;
receive, via the primary radio receiver, the equalized reflection signal; and
determine a response over the second portion of the link in accordance with the first reflection of the first signal and the equalized reflection signal.

24. The full-duplex radio transceiver of claim 23, wherein equalizing the second reflection of the first signal to obtain the equalized reflection signal comprises compensating for the response using least-squares estimation.

25. The full-duplex radio transceiver of claim 23, wherein the first signal and the equalized reflection signal are baseband signals.

26. The full-duplex radio transceiver of claim 23, wherein the primary radio receiver receives the equalized reflection signal and the first reflection of the first signal during a calibration period, the first reflection of the first signal being received by the primary radio receiver prior to the equalized reflection signal during the calibration period, and wherein the full-duplex radio transceiver does not communicate data with another device during the calibration period.

* * * * *